Figure 1:
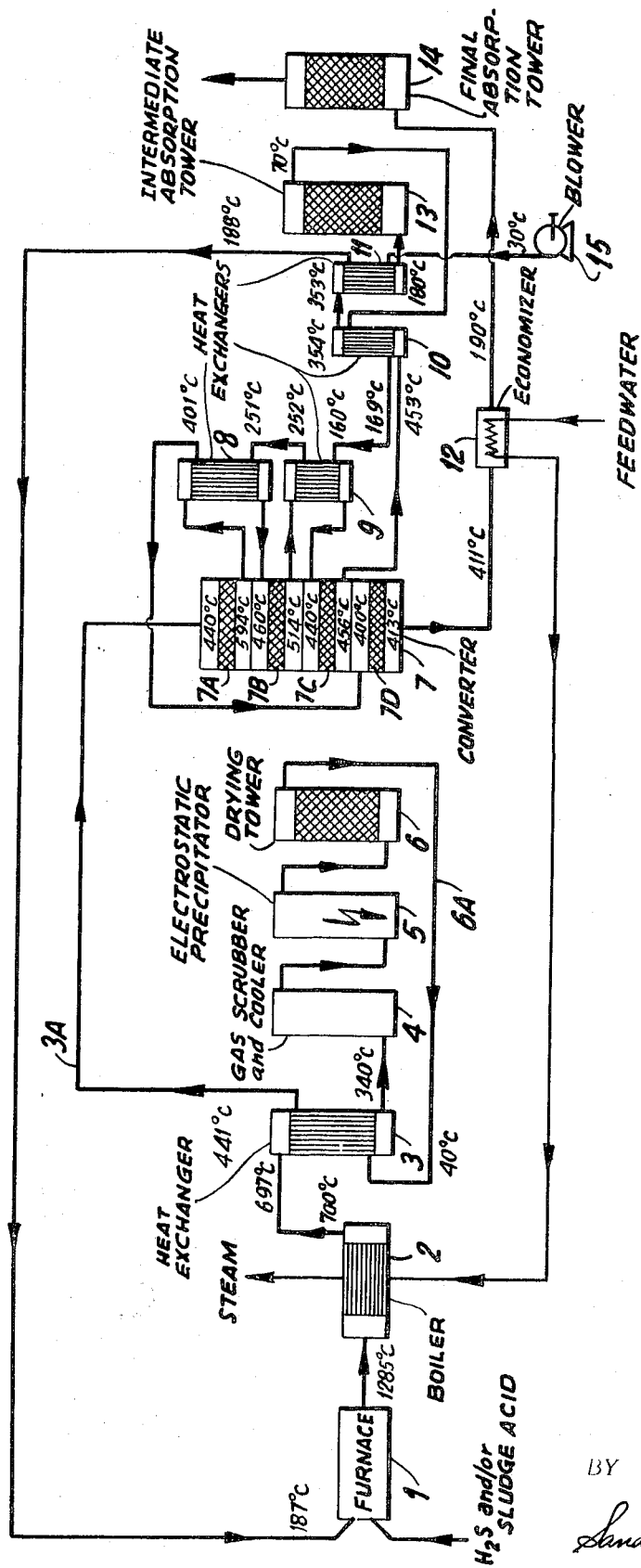

United States Patent

Jaeger

[15] 3,647,360

[45] Mar. 7, 1972

[54] PROCESS FOR THE PRODUCTION OF SULFUR TRIOXIDE BY THE COLD GAS PROCESS

[72] Inventor: Walter Jaeger, Stroudsburg, Pa.
[73] Assignee: Ovitron Corporation, Newburgh, N.Y.
[22] Filed: Apr. 13, 1970
[21] Appl. No.: 27,541

Related U.S. Application Data

[63] Continuation-in-part of Ser. No. 816,687, Apr. 16, 1969.

[52] U.S. Cl..................................23/168, 23/173, 23/176, 23/261
[51] Int. Cl..................................C01b 17/76, C01b 17/80
[58] Field of Search....................23/168, 173, 176, 177, 261

[56] References Cited

UNITED STATES PATENTS

| 1,405,669 | 2/1922 | Chase et al. | 23/176 |
| 3,259,459 | 7/1966 | Moller | 23/176 |
| 3,443,896 | 5/1969 | Furkert et al. | 23/168 |
| 3,454,360 | 7/1969 | Detweiler | 23/168 |
| 3,350,169 | 10/1967 | Rinckhoff | 23/168 |

Primary Examiner—Oscar R. Vertiz
Assistant Examiner—Charles B. Rodman
Attorney—Sandoe, Hopgood and Calimafde

[57] ABSTRACT

Sulfur trioxide is produced by generating sulfur dioxide gas from raw material in a furnace which gas is cooled, cleaned and dried to form cold gas which is then reheated to its corresponding catalytic kindling temperature by passing it through a first heat exchanger, following which the heated cold gas is passed through a first group of catalytic converters. The sulfur trioxide formed is then cooled and removed from the gas stream in a first or intermediate absorber. The remaining tail gas from the first absorber is reheated by heat exchange with hot gas by means of heat exchangers serially connected to the first group of converters and the thus-heated tail gas then finally converted in a last stage catalytic converter to sulfur trioxide which is recovered in a second absorber, this process being known as the double absorption process.

4 Claims, 2 Drawing Figures 3,647,360

PROCESS FOR THE PRODUCTION OF SULFUR TRIOXIDE BY THE COLD GAS PROCESS

This application is a continuation-in-part of my copending application Ser. No. 816,687, filed Apr. 16, 1969, and relates to a process for converting sulfur dioxide to sulfur trioxide in the production of sulfuric acid.

FIELD OF THE INVENTION AND PRIOR ART

Numerous processes have been proposed for the production of sulfuric acid by the oxidation of elemental sulfur to form sulfur dioxide which, after cooling to the proper kindling temperature, is catalytically oxidized to sulfur trioxide, the sulfur trioxide being thereafter absorbed in concentrated sulfuric acid to form further sulfuric acid. Processes which have recently received particular attention comprise partially oxidizing the sulfur dioxide to sulfur trioxide, removing the trioxide by a first absorption step, reoxidizing the tail gas followed by removing the additionally formed sulfur trioxide in a second absorption step. This process is referred to in the trade as the double absorption process and is employed to attain maximum conversion with minimum sulfur dioxide introduced into the surrounding environment with the stack gases. Thus, the process has particular importance in minimizing air pollution.

Several of the known processes differ usually in the type of reheating employed on the tail gases leaving the first absorber. It is known, for example, to employ the flow from an intermediate converter stage (heated oxidized gas) to reheat the tail gas coming from the first absorption tower for oxidation in the next or last catalytic stage, the oxidized gas from the intermediate converter being in turn cooled to the proper ignition temperature prior to introduction into the next intermediate converter stage, if necessary. The oxidation of sulfur dioxide to sulfur trioxide is an exothermic reaction and, since heat is generated, with an attendant rise in temperature, it is necessary that the partially oxidized gas be cooled to its proper kindling temperature before it is introduced into the next converter stage. This is accomplished by means of heat exchangers. A problem that arises in this regard is that a small log mean temperature difference in the heat exchanger units generally requires the use of large heat exchanger surfaces which places economic limitations on the design of sulfur acid plants using such processes. This problem is discussed in some detail in my aforementioned application Ser. No. 816,687.

Other processes are known in which the reheating of the tail gases from the first absorption tower is effected through the use of externally applied heat, such as superheated steam or by the use of an oil-fired reheater. A disadvantage of such processes is the additional cost of heat energy. As illustrative of various processes which have been proposed in overcoming some of the aforementioned problems, reference is made to U.S. Pat. Nos. 3,142,536; 3,259,459; 3,404,955 and 3,404,956.

The process described and claimed in my copending application utilizes the heat of a preceding converter stage for reheating cold tail gas returning from the first or intermediate absorber. The aforementioned process is particularly tailored for the so-called "hot gas" plants.

It would be desirable to provide an improved process for the so-called "cold gas" plants. In the "cold gas" plant, in order to clean and dry the hot generated $SO_2$ gas, it is cooled to about 40° to 45° C. The cooled, cleaned and dried gas which is referred to as "cold gas" is then reheated to its corresponding catalytic kindling temperature by using the heat of the reaction of the first catalytic stages during the partial oxidation of $SO_2$ to $SO_3$. This invention provides an improved process whereby the heat capacity of the $SO_2$ gas from the combustion or roasting furnace is used to reheat the cold gas to the desirable kindling temperature. Thus, with this process, it is now possible in cold gas plants to use the reaction heat of the first converter stage for reheating the cold tail gas from the first absorber.

It is thus an object of this invention to provide an economic cold gas process for the conversion of sulfur dioxide to sulfur trioxide, whereby high conversion yields are obtained.

Another object is to provide a cold gas process for the production of sulfur trioxide in which improved heat economy is effected.

A still further object is to overcome the inherent disadvantages of prior cold gas methods employed in the conversion of sulfur dioxide to sulfur trioxide.

Figure 2:
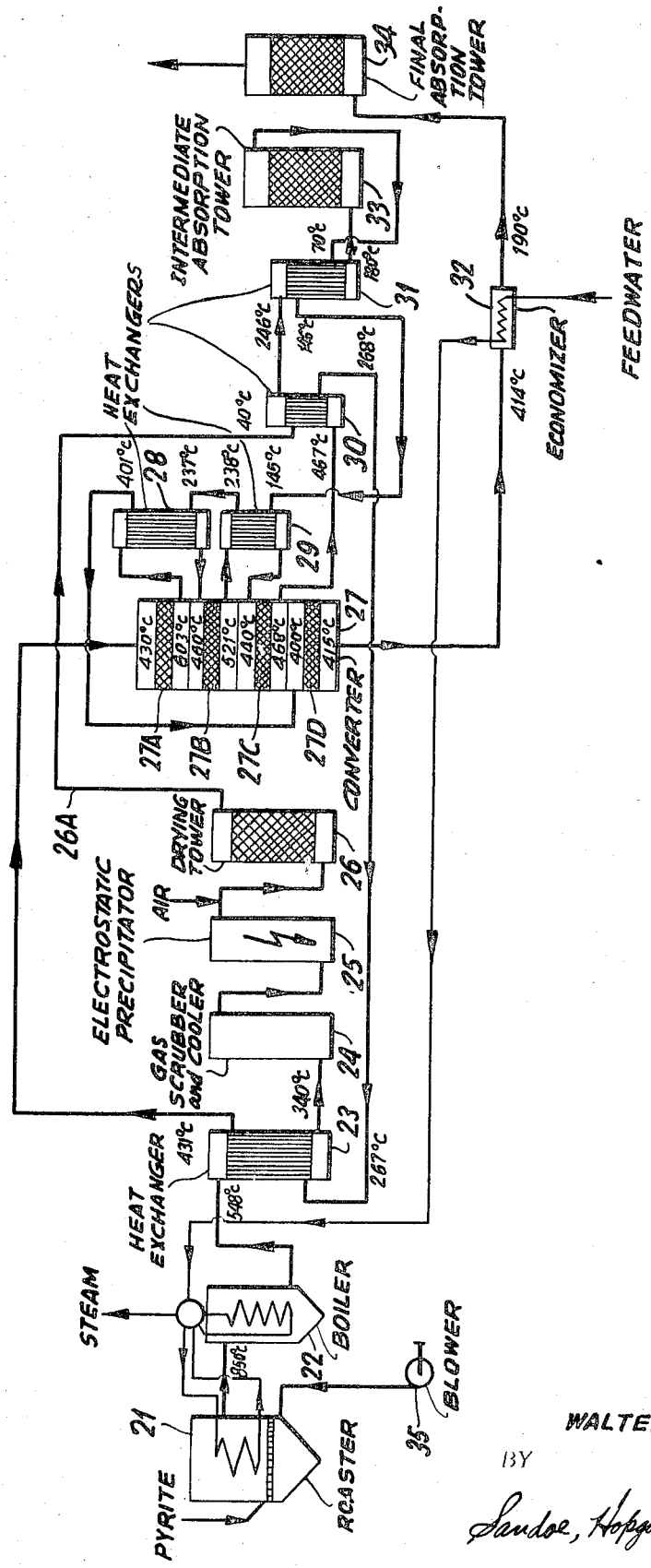

These and other objects will more clearly appear when taken in conjunction with the following disclosure and the accompanying drawing wherein:

FIG. 1 illustrates diagrammatically one apparatus embodiment employed in carrying out the cold gas process of the invention; and FIG. 2 depicts diagrammatically another apparatus embodiment for carrying out the cold gas process of the invention.

STATEMENT OF INVENTION

Stating it broadly, the invention is particularly applicable to the production of sulfuric acid from the combustion of such raw materials as hydrogen sulfide, waste acid or pyrite. The raw material is oxidized to $SO_2$ by burning it with air to produce a gas mixture containing about 6 to 10 percent $SO_2$, 10 to 7 percent oxygen and substantially the balance inert gas, such as nitrogen and carbon dioxide.

The equipment will generally comprise a combustion furnace; a waste heat boiler coupled by appropriate means to the furnace for utilizing the heat of the combusted gas; a first heat exchanger coupled to the waste heat boiler; means for cooling, cleaning and drying the hot gas serially coupled to the first heat exchanger; a group of serially connected catalytic oxidation converters; heat exchangers serially connected to certain of the converter stages for removing excess heat from the partially oxidized gas for use in heating the recycled tail gas; a first or intermediate absorber in which the initially partially oxidized gas is absorbed and the said cold tail gas which remains recycled to succeeding converter stages for further oxidation to sulfur trioxide and a second absorber for absorbing the additionally formed sulfur trioxide.

It has been found that by using the sensible heat of the hot gas in the first heat exchanger to heat the cold gas to the kindling temperature, an important advantage is achieved; the reaction heat of the first and second converters can be used to heat the recycled tail gas to the desirable ignition temperature for final conversion to $SO_3$.

DETAILS OF THE INVENTION

The advantages of the invention will be understood in the context of the flow diagram of FIG. 1, it being understood that the embodiment shown therein is only by way of illustration and not by way of limitation, since variations and modifications may be resorted to, for example, in the temperatures stated, without departing from the spirit and scope of the claimed invention, as those skilled in the art will readily understand.

Thus, referring to FIG. 1, a combustion furnace 1 is shown for burning $H_2S$ or sludge acid which is controlled to burn the raw material and produce a gas at 1,285° C. containing about 7.7 percent $SO_2$, about 8.5 percent $O_2$, about 7.8 percent $CO_2$ and about 76 percent $N_2$. The hot gas leaves the furnace at a temperature of about 1,285° C. and enters waste heat boiler 2 and gives up a substantial amount of heat for steam generation, as shown, following which the gas leaves the waste heat boiler at a temperature of about 700° C. the hot gas enters a first heat exchanger 3 at a temperature of about 697° C. where it is cooled to about 340° C. The heat exchanger is also used to reheat the dried cold gas which is the cold gas produced by passing the gas from the heat exchanger to a gas scrubber and cooling section 4 where the gas is cooled to about 40° to 45° C., then to electrostatic precipitator 5 where it is cleaned of dust and acid mist, and the gas finally dried in drying tower 6.

The dry cold SO₂ gas from the tower 6 is recycled via line 6A to heat exchanger 3 at about 40° C. where it is reheated to a kindling temperature of about 441° C. and directed via line 3A at a temperature of about 440° C. to a group 7 of serially connected catalytic converter stages 7A to 7D, the gas entering the first stage 7A from which it exits at a higher temperature of about 594° C. due to the heat of reaction resulting from the oxidation of some of the sulfur dioxide to sulfur trioxide. Since the gas must be cooled to the desirable kindling temperature before it enters the second stage in order to achieve optimum oxidation according to the equilibrium of the reaction, it is passed through heat exchanger 8 where it is cooled to about 460° C. before it enters second stage 7B. The gas is further oxidized in the second converter stage 7B and leaves this stage at a temperature of about 514° C. and enters heat exchanger 9 at this temperature where it is cooled to about 440° C., following which it flows into third converter stage 7C and further oxidized where it reaches a temperature of 456° C. this gas is then passed through heat exchanger 10 at about 455° C. where it is cooled to about 354° C. and then to heat exchanger 11 where it is cooled to 180° C., this heat exchanger being used to preheat air coming from air blower 15 to 188° C. for use in the furnace 1. The partially oxidized gas is now cooled to 180° C., at which temperature it enters the first absorber 13 in which the sulfur trioxide is separated, with the remaining tail gas then leaving the first absorber at a temperature of about 70° C.

The tail gas at this temperature is recycled for further oxidation by passing it through serially connected heat exchangers 10, 9 and 8 countercurrent to the flow of hot gas for reheating to 401° C. by indirect heat exchange with the hot reacted gas from the first and second stage converters 7A and 7B, following which the reheated gas enters the fourth and last stage 7D at about 400° C. for substantially complete conversion to sulfur trioxide. The converted gas at 413° C. leaves the last converter stage at a temperature of about 411° C. and is cooled as it passes through economizer 12 for preheating the feed water to waste heat boiler 2. The gas is cooled by the economizer to about 190° C. and then introduced into the second absorber 14 where the sulfur trioxide is recovered as sulfuric acid.

By utilizing the foregoing embodiment, a total conversion of over 99 percent, for example, over about 99.5 percent, is achieved. This will be appreciated from the explanation given in my copending application Ser. No. 816,687 which is incorporated herein by reference.

As has been stated in the aforementioned copending case, such high recoveries have the added advantage in that relatively clean stack gases are obtained low in sulfur, for example, as low as below 500 parts of SO₂ per million. It is not uncommon in the more conventional sulfuric acid plants to have stack gases containing 3,000 to 5,000 parts per million of sulfur dioxide.

Thus, summarizing the system of the type illustrated in FIG. 1, H₂S and/or sludge acid are burned to provide a hot combusted gas at a temperature of about 1,000° C. to 1,350° C. containing about 6 to 10 percent sulfur dioxide, about 10 to 7 percent oxygen and the balance substantially inert gas (nitrogen and carbon dioxide). The hot gas is passed through waste heat boiler 2 where it is cooled to a temperature ranging from about 600° to 800° C.; following which it is passed through heat exchanger 3 where it enters at a temperature of about 600° to 800 °C. and leaves the heat exchanger at about 300° to 375° C. and is cooled, cleaned and dried to about 40° to 50° C. by passing through gas scrubber and cooler 4, electrostatic precipitator 5 and drying tower 6. The cooled gas from the drying tower is reheated to a catalytic kindling temperature of about 410° to 450° C. in heat exchanger 3 following which the cleaned hot gas is fed to the first stage 7A of the four-stage catalytic converter in which the gas is partially oxidized to sulfur trioxide and reaches a reaction temperature of about 560° to 620° C. The hot partially oxidized gas is passed through second heat exchanger 8 (interstage heat exchanger) serially connected between the first and second stage converters 7A, 7B, and the gas cooled to a catalytic kindling temperature of between 440° and 480° C. before it enters the second stage converter. The gas is further converted to sulfur trioxide in second stage converter 7B where it reaches a reaction temperature of about 510° to 570° C., at which temperature it enters a third heat exchanger 9 (interstage heat exchanger) serially connected between the second and third stage converters 7B and 7C. The hot gas is cooled in the second heat exchanger to a temperature of about 420° to 450° C. at which temperature it enters third stage converter 7C where it is further oxidized and reaches a reaction temperature of about 450° to 480° C., following which it is passed through heat exchanger 10 where it is cooled to a temperature of about 330° to 370° C. prior to entering heat exchanger 11 where it is cooled to 150° to 200° C. before entering the first or intermediate absorber 13. The sulfur trioxide is absorbed and the tail gas removed from the absorber at a temperature of about 60° to 90° C. and recycled for final reaction in the last stage converter 7D, the recycled tail gas passing through serially connected heat exchangers 10, 9 and 8 where it is heated to a catalytic kindling temperature of about 395° to 420° C., while cooling the hot gases from the first and second stage converters. The heated tail gas is then passed through the fourth or last stage converter and leaves it at a temperature of about 410° to 435° C., the reacted gas being then passed through economizer 12 or other suitable exchanger for cooling down to 150° to 200° C. prior to entering the second or final absorber 14, the tail gas being thereafter discarded into the environment.

Referring now to the embodiment of FIG. 2, pyrite is roasted in furnace 21 via air fed by blower 35, and leaves the furnace at a temperature of about 850° C. with an SO₂ content of about 12 percent. The hot gas is cooled in waste heat boiler 22 to a temperature of approximately 550° C. As in FIG. 1, a first heat exchanger 23 is provided which cools the gas to about 340° C. The heat exchanger is similarly used to reheat the dried cold gas which is the cold gas produced by passing the gas from the heat exchanger to a gas scrubber and cooling section 24 where the gas is cooled to about 40° to 45° C., then to an electrostatic precipitator 25 where it is cleaned of dust and acid mist and the gas finally dried in drying tower 26. After the precipitator, air is bled into the gas to reduce the SO₂ content to about 9 percent.

The clean dry cold SO₂ gas from tower 26 is then passed through line 26A to a heat exchanger 30 at 40° C. where it is preheated to a temperature of about 268° C., the preheated gas being then recycled to heat exchanger 23 where it is further heated to a kindling temperature of about 431° C. and then fed at about 430° C. to a group 27 of serially connected catalytic converter stages 27A to 27D, the gas entering the first stage 27A from which it exits at a higher temperature of about 603° C. Since the gas must be cooled to the desirable kindling temperature before it enters the second stage in order to achieve optimum oxidation according to the equilibrium of the reaction, it is passed through heat exchanger 28 where it is cooled to about 460° C. before it enters converter stage 27B.

The gas is further oxidized in the second converter and leaves stage 27B at a temperature of about 521° C. and enters heat exchanger 29 at this temperature where it is cooled to about 440° C., following which it flows into third converter stage 27C and further oxidized to a temperature of about 468° C.

The heated gas is then cooled to about 246° C. by passing it through heat exchanger 30 and the gas further cooled in serially connected heat exchanger 31 to about 180° C., following which it enters first absorber 33 in which the sulfur trioxide is separated, with the remaining tail gas then leaving the first absorber at a temperature of about 70° C.

The tail gas at this temperature is recycled for further oxidation by passing it through serially connected heat exchangers 31, 29 and 28 for reheating to about 401° C. by indirect heat exchange with the hot reacted gas from the first and second stage converters 27A and 27B following which the reheated gas enters the fourth and last stage 27D at about 400° C. for substantially complete conversion to SO₃. The converted gas at 415° C. leaves the last converter stage and enters economizer 32 at about 414° C. where it is cooled to about 190° C. and then introduced into the second absorber 34 where the remaining sulfur trioxide is recovered as sulfuric acid. The economizer is used to heat feed water fed to waste heat boiler 22.

The temperature ranges which may be employed in carrying out the foregoing embodiment are as follows:

Thus, pyrite is burned to provide about 10 to 14 percent SO₂ at about 750° to 950° C., with oxygen ranging from about 8 to 2.8 percent, and the balance nitrogen. The gas is cooled by the waste heat boiler to a temperature of about 520° to 620° C. and then cooled further in heat exchanger 23 to a temperature of about 300° to 375° C., following which the gas is cleaned and dried to a temperature of about 40° to 50° C. in apparatus 24, 25 and 26.

The cooled gas is then preheated in heat exchanger 30 to a temperature of about 225° C. to 300° C., following which the preheated gas is further heated in first heat exchanger 23 to a kindling temperature of about 410° to 450° C. Thereafter, the temperature ranges employed in the various converter stages and the related heat exchangers correspond to those given for FIG. 1 and need not be repeated here.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a cold gas process for producing sulfuric acid by double absorption utilizing a group of a plurality of serially connected catalytic converter stages and a last stage and including a first and second absorber, wherein hot SO₂ gas generated in a furnace is first cooled, cleaned and dried to cold gas which cleaned cold gas is then reheated to the corresponding catalytic kindling temperature prior to being fed to said group of converter stages, the improvement which comprises, a. passing the generated hot SO₂ gas from said furnace through a waste heat boiler and from there to a first heat exchanger, whereby said first heat exchanger is maintained at a temperature above the kindling temperature of the SO₂ gas by virtue of the sensible heat of the hot SO₂ gas passing therethrough,
   b. cooling, cleaning and drying said gas emitting from said first heat exchanger whereby to form clean and dry cold SO₂ gas,
   c. recycling said cold SO₂ gas to said first heat exchanger maintained at above the catalytic kindling temperature for said cold gas whereby said cold gas is heated to said kindling temperature,
   d. partially oxidizing said heated cold gas to SO₃ by passing it serially through said plurality of converter stages serially connected to each other via interstage heat exchangers,
   said partially oxidized hot gas emitted from each converter stage being cooled to its kindling temperature via each of said interstage heat exchangers before entering the next stage for further oxidation, except for the last stage,
   e. cooling said further partially oxidized hot gas prior to said last stage, and then passing it through the first absorber to recover SO₃ therefrom and form cold tail gas,
   f. removing the cold tail gas from the first absorber and heating it to its corresponding catalytic kindling temperature by passing it in countercurrent and heat exchange relationship to the hot gas passing serially through said interstage heat exchangers,
   g. and then passing the heated tail gas through the last converter stage for final conversion to SO₃ which is then cooled and recovered in the second absorber.

2. In a cold gas process for producing sulfuric acid by double absorption by burning H₂S and/or sludge acid to produce a gas at a temperature ranging from about 1,000° to 1,350° C. containing about 6 to 10 percent SO₂, about 10 to 7 percent O₂ and the balance substantially nitrogen by utilizing a group of at least four series-connected catalytic converter stages and a first and second absorber, wherein the SO₂-containing gas is partially oxidized to SO₃ in the first three stages to form a hot gas and the SO₃ removed in the first absorber, and wherein cold tail gas from the first absorber is reheated and reoxidized in the last converter stage to SO₃ which is recovered in the second absorber, the improvement which comprises, passing the hot gas from the furnace to a waste heat boiler where the gas is cooled to a temperature of about 600° to 800° C. which is then passed through a first heat exchanger and leaves the heat exchanger at a temperature of about 300° to 375° C., cleaning, cooling and drying said gas to a temperature of about 40° to 50° C. whereby to provide cold gas, recycling said cold gas through said first heat exchanger to reheat it to its corresponding catalytic kindling temperature ranging from about 410° to 450° C., passing said reheated cold gas through the first converter stage and partially oxidizing it to a temperature of about 560° to 620° C., passing the partially oxidized hot gas from the first converter stage through a serially connected second heat exchanger where the hot gas is cooled to a catalytic kindling temperature of about 440° to 480° C., passing the cooled oxidized gas through the second converter stage for further oxidation to a temperature of about 510° to 570° C. and from there through a third serially connected heat exchanger where the hot gas is cooled to a catalytic kindling temperature of about 420° to 450° C., further oxidizing the gas to a temperature of about 450° to 480° C. by passing it through the third converter stage, the hot gas leaving the third stage being then cooled to a temperature of about 330° to 370° C. in a fourth heat exchanger, following which the gas is further cooled to 150° to 200° C. and passed through the first absorber, removing cold tail gas from the first absorber at a temperature of about 60° to 90° C. and heating it it its catalytic kindling temperature of about 395° to 420° C. by passing it countercurrently and successively through the fourth, third and second heat exchangers, the heated tail gas being then passed through the last converter stage for final conversion to SO₃ which is then recovered in the second absorber.

3. In a process for producing sulfuric acid by double absorption by burning pyrite to produce a gas at a temperature of about 750° to 950° C. containing about 10 to 14 percent SO₂, about 8 to 2.8 percent O₂ and the balance substantially nitrogen by utilizing a group of at least four series connected catalytic converter stages and a first and second absorber, wherein the SO₂-containing gas is partially oxidized to SO₃ in the first three stages to form a hot gas and the SO₃ removed in the first absorber, and wherein cold tail gas from the first absorber is reheated and reoxidized in the last converter stage to SO₃ which is recovered in the second absorber, the improvement which comprises, passing the hot gas from the furnace to a waste heat boiler where the gas is cooled to a temperature of about 520° to 620° C. which is then passed through a first heat exchanger and leaves the heat exchanger at a temperature of about 300° to 375° C., cleaning, cooling and drying said gas to a temperature of about 40° to 50° C. whereby to provide cold gas, recycling said cold gas through a fourth heat exchanger serially coupled to the third catalytic converter stage, to preheat the cold gas to a temperature of about 225° to 300° C. following which the preheated gas is further heated in the first heat exchanger to a catalytic kindling temperature of about 410° to 450° C., passing said reheated cold gas through the first converter stage and partially oxidizing it to a temperature of about 560° to 620° C., passing the partially oxidized hot gas from the first converter stage through a serially connected second heat exchanger where the hot gas is cooled to a catalytic kindling temperature of about 440° to 480° C., passing the cooled oxidized gas through the second converter stage for further oxidation to a temperature of about 510° to 570° C. and from there through a third serially connected heat exchanger where the hot gas is cooled to a catalytic kindling temperature of about 420° to 450° C., further oxidizing the gas to a temperature of about 450° to 480° C. by passing it through the third converter stage, the hot gas leaving the third stage being cooled to a temperature of about 330° to 370° C. in said fourth heat exchanger, following which the gas is further cooled to 150° to 200° C. and passing through the first absorber, and removing cold tail gas from the first absorber at a temperature of about 60° to 90° C. and heating it to its kindling temperature of about 395° to 420° C. by passing it countercurrently and successively through the fourth, third and second heat exchangers, the heated tail gas being then passed through the last converter stage for final conversion to $SO_3$ which is then recovered in the second absorber.

4. In an apparatus for producing sulfuric acid by the double absorption cold gas process using a group of at least four series-connected catalytic converters and a first and second absorber, wherein hot $SO_2$ gas is first cooled, cleaned and dried to cold gas before subsequently reheating the cold gas, the catalytic conversion thereof to $SO_3$, and recovery in the first absorber, the improvement characterized in:

a. a furnace for generating hot $SO_2$-containing gas,
  b. a waste boiler coupled to said furnace for receiving said hot $SO_2$ gas,
  c. a first heat exchanger coupled to said waste heat boiler for removing heat from said hot gas,
  d. means for cooling, cleaning, and drying said hot gas series coupled to said first heat exchanger, said first heat exchanger being coupled to the input side of said cooling, cleaning and drying means,
  e. output means coupling said cooling, cleaning and drying means to said first heat exchanger, whereby to heat cold $SO_2$ gas emanating therefrom to a catalytic kindling temperature,
  f. means coupling said first heat exchanger to the first converter,
  g. a second heat exchanger series connected between the first and second converter, for cooling the hot gas from the first converter,
  h. a third heat exchanger series connected between the second and third converter for cooling the hot gas from the second converter,
  i. a first absorber,
  j. means for conducting cold tail gas from the first absorber through a series connection through the third and second converter to heat said cold tail gas to its corresponding catalytic kindling temperature,
  k. means for conducting said heated cold tail gas from the second heat exchanger to the last converter for conversion to hot $SO_3$,
  l. a second absorber,
  m. and means for conducting said hot $SO_3$ gas from the last converter through a cooling means to the second absorber.

* * * * *